United States Patent
Luo et al.

(10) Patent No.: US 10,027,623 B2
(45) Date of Patent: Jul. 17, 2018

(54) INTERNET PROTOCOL ADDRESS RESOLUTION

(71) Applicant: Hangzhou H3C Technologies Co., Ltd., Hangzhou (CN)

(72) Inventors: Xin Luo, Beijing (CN); Congyang Zhou, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/769,212

(22) PCT Filed: Feb. 27, 2014

(86) PCT No.: PCT/CN2014/072592
§ 371 (c)(1),
(2) Date: Aug. 20, 2015

(87) PCT Pub. No.: WO2014/161408
PCT Pub. Date: Oct. 9, 2014

(65) Prior Publication Data
US 2016/0036773 A1  Feb. 4, 2016

(30) Foreign Application Priority Data
Apr. 2, 2013  (CN) .......................... 2013 1 0113891

(51) Int. Cl.
*H04L 12/28* (2006.01)
*H04L 12/56* (2006.01)
(Continued)

(52) U.S. Cl.
CPC ...... *H04L 61/2503* (2013.01); *H04L 12/4604* (2013.01); *H04L 12/4633* (2013.01);
(Continued)

(58) Field of Classification Search
None
See application file for complete search history.

(56) References Cited

U.S. PATENT DOCUMENTS

2002/0046271 A1*  4/2002  Huang ................... H04L 45/00
                                                          709/223
2003/0227930 A1   12/2003  Choi et al.
(Continued)

FOREIGN PATENT DOCUMENTS

CN       101499951        8/2009
CN       102217253       10/2011
(Continued)

OTHER PUBLICATIONS

International Search Report and Written Opinion dated Jun. 10, 2014 issued on PCT Patent Application No. PCT/CN2014/072592 dated Feb. 27, 2014, The State Intellectual Property Office, P.R. China.
(Continued)

*Primary Examiner* — Rebecca E Song
(74) *Attorney, Agent, or Firm* — Michael A. Dryja

(57) ABSTRACT

A first edge node in a first site network receives an Internet Protocol (IP) address resolving request packet from a device in the first site network. The first edge node replaces a source Media Access Control (MAC) address of an Ethernet frame header and a sender MAC address in a packet body of the IP address resolving request packet with the MAC address of the first edge node. The first edge node forwards the IP address resolving request packet to a second site network via a tunnel linking the first site network and the second site network.

20 Claims, 4 Drawing Sheets

(51) Int. Cl.
*H04L 29/12* (2006.01)
*H04L 12/46* (2006.01)
*H04L 12/741* (2013.01)

(52) U.S. Cl.
CPC .......... *H04L 45/745* (2013.01); *H04L 61/103* (2013.01); *H04L 61/255* (2013.01); *H04L 61/6013* (2013.01); *H04L 61/6068* (2013.01)

(56) References Cited

U.S. PATENT DOCUMENTS

| | | |
|---|---|---|
| 2009/0037607 A1 | 2/2009 | Farinacci et al. |
| 2010/0095020 A1 | 4/2010 | Rixner |
| 2013/0254359 A1* | 9/2013 | Boutros ................ H04L 61/103 709/223 |
| 2014/0092907 A1* | 4/2014 | Sridhar .................. H04L 45/74 370/392 |
| 2014/0119372 A1* | 5/2014 | Patel ..................... H04L 49/354 370/392 |
| 2014/0254597 A1* | 9/2014 | Tian ................. H04L 29/12839 370/392 |

FOREIGN PATENT DOCUMENTS

| | | |
|---|---|---|
| CN | 102265568 | 11/2011 |
| CN | 102355417 A | 2/2012 |
| CN | 103179228 | 6/2013 |
| WO | WO-2013049989 A1 | 4/2013 |
| WO | WO-2014036938 A1 | 3/2014 |

OTHER PUBLICATIONS

Extended European Search Report, EP Application No. 14778340.1, dated Nov. 7, 2016, pp. 1-9, EPO.

\* cited by examiner

INTERNET PROTOCOL ADDRESS RESOLUTION

CLAIM FOR PRIORITY

The present application is a national stage filing under 35 U.S.C. § 371 of PCT application number PCT/CN2014/072592, having an international filing date of Feb. 27, 2014, which claims priority to Chinese patent application number 201310113891.7, having a filing date of Apr. 2, 2013, the disclosures of which are hereby incorporated by reference in their entireties.

BACKGROUND

Data communications in a conventional network may be Internet Protocol (IP) data communications based on Layer 3 IP addresses. However, IP hosts in a same network segment are often in a same Layer 2 network, and these IP hosts (a Personal Computer (PC), a server, etc.) are interconnected by a switching device to form a Layer 2 communication network, so as to meet communication demands of hosts in the network. Two hosts, which are communicating with each other, may perform a communication in the manner of Layer 2 traffic forwarding, after resolving Layer 2 and Layer 3 addresses. The switching device may forward Layer 2 traffic, by identifying a source Media Access Control (MAC) address and a target MAC address in a Layer 2 packet header of the traffic.

DETAILED DESCRIPTIONS

Figure 1:
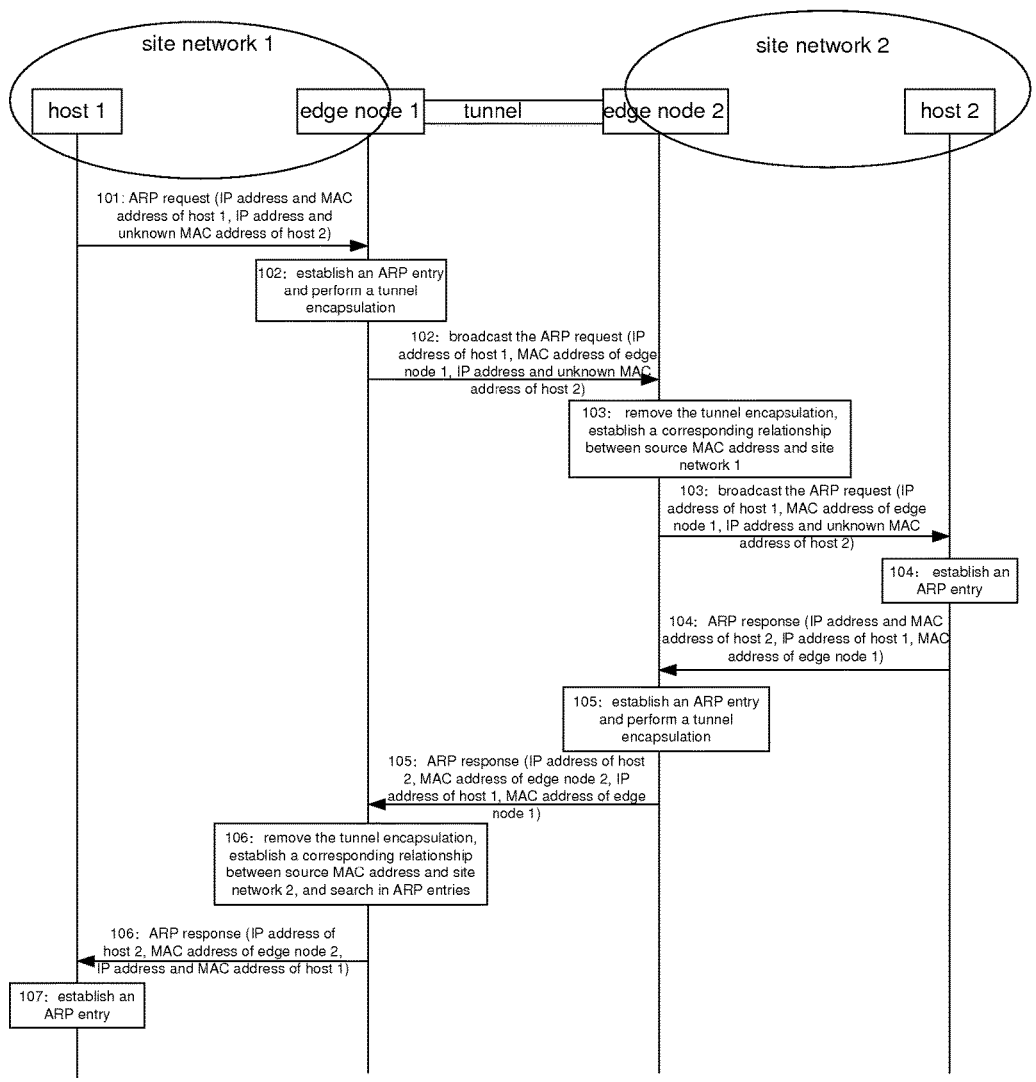
FIG. 1 is a flowchart illustrating a method for resolving IP addresses in an overlay network, in accordance with an example of the present disclosure.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Along with expansion of a network scale and new demands on reliability and redundancy backup deployment, nowadays most enterprise networks and data center networks thereof are likely to be deployed across multiple physical sites located in different geographical locations. These sites are often connected by Layer 3 links to form a Layer 3 communication network among the sites. Data of communication traffic among sites may be forwarded, by identifying a source IP address and a destination IP address in a Layer 3 packet header of the data.

Deployment of a Layer 2 network in each of the physical sites may be not extended to another site, since it is blocked by a Layer 3 network. Many applications supportable in a Layer 2 network, such as dynamic resources allocation and management, free migration of a virtual machine (migration process is transparent to a user and the IP address may be not changed), may be not implemented among multiple physical sites across the Layer 3 network.

Overlay networks, such as the Ethernet Virtualization Interconnection (EVI) technique, may connect Layer 2 networks in geographically dispersed physical sites together, by establishing a Layer 2 tunnel over the Layer 3 network connecting the sites. Thus the tunnel connects edge devices of the geographically dispersed physical sites with a virtual layer 2 connection. This enables Layer 2 network deployment across the physical sites, by crossing a Layer 3 core network (CN), i.e., applications of various Layer 2 services across the Layer 3 network may be supported.

Overlay networks, such as EVI, may use a "MAC in IP" technique, such as a Layer 2 Virtual Private Network (VPN) technique based on an IP core network (CN). The overlay network may maintain Layer 3 routing and Layer 2 forwarding information at an edge device of a site, without changing the internal network of the site or the CN.

An entire overlay network may include site networks, an overlapping network and a CN. The basic concepts of the overlay network are introduced in brief in the following.

A site network is a Layer 2 network having an independent service function, which may be connected to the CN via one or more edge devices. The site network may mainly include hosts and a switching device. The edge device may provide a function of Layer 2 interconnection among sites.

The overlapping network is a virtual network established among edge devices of the site networks, which may provide Layer 2 interconnection among the site networks. The site networks may notify each other of information of Layer 2 MAC addresses in the respective site network via the overlapping network. Subsequently, multiple sites may be interconnected to form a larger Layer 2 forwarding network.

The CN is a network, which may provide interconnection among the site networks. The CN may be mainly borne by a Layer 3 forwarding device.

An edge device is a switching device located at an edge of a site network, which may perform the overlay function (for example EVI). The edge device may operate as a Layer 2 device at the side of the site, while may operate as a Layer 3 device at the side of the CN. The edge devices mainly provide Layer 2 interconnection among the site networks. Specifically speaking, the edge devices may implement mapping and forwarding of a packet from a site network to a tunnel and from the tunnel to a site network.

An overlay link (e.g. EVI link) is a bidirectional virtual channel between a pair of edge devices in a same overlay network instance (e.g. same EVI instance), and is to implement transparent transmission of data of sites between the edge devices. The channel may be borne by a tunnel (e.g. an EVI tunnel). One tunnel may bear multiple overlay links. An overlay link may be identified, by using IP addresses of an overlay-link interface and a remote edge device.

While EVI is discussed in the following as an example, it is to be understood that the principles discussed herein may be applied to other types of overlay network as well. An EVI tunnel may be a generic routing encapsulation (GRE) tunnel, which may bear an EVI link. One EVI tunnel may bear multiple EVI links. An EVI tunnel is a point to multipoint tunnel. An edge device of a site may establish connections with edge devices of multiple neighbor sites via one EVI tunnel. Each connection may correspond to one EVI link.

A certain change will occur in organization and management of an original Layer 2 MAC address forwarding table, after an EVI Layer 2 VPN across the Layer 3 network is formed. At this time, each edge device needs to manage not only a MAC address forwarding table of the local site, but also information of remote MAC addresses issued by other edges devices at remote ends of an EVI tunnel, so as to implement local and remote forwarding of Layer 2 traffic at an edge node. In such a case, Layer 2 data traffic may be forwarded between the local site and remote sites across the Layer 3 network, via connections of EVI tunnels among the edge nodes.

Thus, it can be seen that in a case where there are many physical sites and hosts in the EVI network, the switching device of each edge node needs to maintain data of MAC addresses of the entire Layer 2 VPN network. The MAC addresses exert a great information capacity pressure on edge nodes, and there is repeated management of the MAC addresses by the edge nodes.

As can be seen, each edge node in the entire EVI network needs to acquire information of MAC addresses in all of remote site networks, so as to ensure correct forwarding of traffic in all directions. Thus, searching out and forwarding of traffic may be implemented, by maintaining a complete Layer 2 forwarding table carrying information of local and remote MAC addresses.

Thus, it can be seen that the capacity pressure on the edge node exerted by the MAC address forwarding table may correspond to the number of the MAC addresses in the entire EVI Layer 2 VPN. And for each edge node in the entire EVI network, there is the same problem of storage pressure exerted by the MAC address forwarding table.

Data forwarding among site devices in an overlay network may be implemented with the following two processes.

Process I refers to an IP address resolving process, in which a MAC address of a device of a remote site may be acquired.

Process II refers to a data forwarding process. Data communication with the device of the remote site may be performed, after the MAC address of the device of the remote site is acquired.

The two processes are respectively described in the following.

FIG. 1 is a flowchart illustrating a method for resolving IP addresses in an overlay network, in accordance with an example of the present disclosure. As shown in FIG. 1, the method may include the following blocks.

In block 101, a host 1 in a site network 1 of an overlay (e.g. EVI) network is to communicate with a host 2 in a site network 2 of the overlay (e.g. EVI) network. When there is no address resolution protocol (ARP) entry corresponding to the IP address of host 2 in an ARP table, an ARP request packet may be transmitted. In the packet body, the sender IP address is the IP address of host 1, the sender MAC address is the MAC address of host 1, the target IP address is the IP address of host 2, and the target MAC address is a MAC address of all zeros.

The ARP request packet in this block is a broadcast packet. The source MAC address of the Ethernet frame header of the broadcast packet is the MAC address of host 1, and the destination MAC address of the Ethernet frame header of the broadcast packet is a broadcast address of all 'F'.

In block 102, an edge node 1 of site network 1 may receive the ARP request packet, perform ARP learning by using the ARP request packet, and establish an ARP entry for host 1. The IP address in the ARP entry established is the sender IP address in the packet body. The MAC address in the ARP entry established is the sender MAC address in the packet body. Edge node 1 may issue the ARP entry into the ARP table. Since the destination MAC address of the packet is the broadcast address, edge node 1 may replace both the sender MAC address and the source MAC address of the Ethernet frame header in the packet with the MAC address of edge node 1, and then forward the packet to all of remote edge nodes via an EVI tunnel.

In this example, edge node 1 may respectively perform a tunnel encapsulation (e.g. an EVI encapsulation) for the ARP request packet, based on the IP address of each of the remote edge nodes stored by edge node 1, and then transmit each encapsulated ARP request packet via a corresponding tunnel. The source IP address of a tunnel encapsulation header is the IP address of edge node 1 (specifically, the IP address of an EVI tunnel interface corresponding to the EVI link interface). The destination IP address of the tunnel encapsulation header is the IP address of a remote edge node (specifically, the IP address of a peer EVI tunnel interface corresponding to the EVI link interface).

When there is already an ARP entry for the IP address of host 1 in the ARP table of edge node 1, edge node 1 may update the existing ARP entry as the newly established ARP entry.

Edge nodes of different site networks may notify each other of their respective IP addresses and identifiers of the site networks to which they belong through the Intermediate System to Intermediate System (IS-IS) protocol after starting. In this way, each edge node will save the IP addresses of the other edge nodes and the identifiers of the site networks to which the other edge nodes belong. In this block, when edge node 1 saves the IP addresses of n remote edge nodes, edge node 1 may perform the tunnel encapsulation (e.g. an EVI encapsulation) for the ARP request packet n times. The encapsulation of each time may correspond to one remote edge node. That is, the destination IP address of each tunnel encapsulation header (e.g. each EVI encapsulation header) may point to one remote edge node. In this way, the ARP request will respectively reach the n remote edge nodes.

In block 103, an edge node of any remote site network, assumed to be an edge node 2 of a site network 2, may receive the EVI-encapsulated ARP request packet, determine that the source IP address of the tunnel encapsulation header (e.g. an EVI encapsulation header) of the packet is the IP address of site network 1, acquire the source MAC address of the Ethernet frame header of the packet, and establish a corresponding relationship between the source MAC address and site network 1 in a MAC address forwarding table, after removing the tunnel encapsulation (e.g. an EVI encapsulation) of the packet. Since the destination MAC address of the packet is the broadcast address, edge node 2 may broadcast the packet in site network 2.

In block 104, host 2 in site network 2 may receive the ARP request packet, find that the target IP address in the packet body is the IP address of host 2, and accordingly establish an ARP entry. In the established ARP entry, the IP address is the sender IP address in the packet, and the MAC address is the sender MAC address in the packet. Host 2 may issue the ARP entry into the ARP table. Then, host 2 may return an ARP response packet. The sender IP address and sender MAC address of the ARP response packet are respectively the IP address and MAC address of host 2. The target IP address and target MAC address in the ARP response packet are respectively the sender IP address and the sender MAC address of the ARP request packet.

Specifically speaking, in the ARP entry established by host 2, the IP address is the IP address of host 1, and the MAC address is the MAC address of edge node 1. In the packet body of the ARP response packet, the target IP address is the IP address of host 1, and the target MAC address is the MAC address of edge node 1. The destination MAC address of the Ethernet frame header of the packet is the MAC address of edge node 1, and the source MAC address is the MAC address of host 2.

In block 105, edge node 2 may receive the ARP response packet, perform ARP learning by using the ARP response packet, establish an ARP entry for host 2. In the ARP entry established, the IP address is the sender IP address of the packet, and the MAC address is the sender MAC address of the packet. Edge node 2 may issue the ARP entry into the ARP table, replace the sender MAC address of the packet body of the packet and the source MAC address of the Ethernet frame header with the MAC address of edge node 2. Edge node 2 may find that the destination MAC address of the Ethernet frame header of the packet is the MAC address of remote site network 1, and perform the tunnel encapsulation (e.g. an EVI encapsulation) for the packet. The destination IP address of the tunnel encapsulation header (e.g. an EVI encapsulation header) is the IP address of edge node 1 of site network 1. And then, edge node 2 may transmit the packet via a tunnel (e.g. an EVI tunnel).

Since in block 103 after receiving the ARP request packet, edge node 2 may establish the source MAC address of the Ethernet frame header of the packet, that is, a corresponding relationship between the MAC address of edge node 1 and site network 1. Thus, in this block, after receiving the ARP response packet, edge node 2 may learn that the destination MAC address of the Ethernet frame header of the packet is the MAC address of site network 1, based on the corresponding relationship.

When there is an ARP entry for the IP address of host 2 in the ARP table of edge node 2, edge node 2 may update the existing ARP entry as the newly established ARP entry.

In block 106, edge node 1 may receive the ARP response packet, determine that the source IP address of the tunnel encapsulation header (e.g. an EVI encapsulation header) of the packet is the IP address of site network 2, remove the tunnel encapsulation (e.g. an EVI encapsulation) of the packet, and save a corresponding relationship between the source MAC address of the Ethernet frame header of the packet and site network 2 in a MAC address forwarding table. Since the destination MAC address of the Ethernet frame header of the packet is the MAC address of edge node 1, edge node 1 may search out in its own ARP entries a MAC address corresponding to the target IP address of the packet body of the packet, and forward the packet to host 1, based on a searching result. Specifically speaking, edge node 1 may modify the destination MAC address of the packet as a MAC address corresponding to the target IP address of the packet body, and then forward the packet.

In block 107, host 1 may receive the ARP response packet, establish an ARP entry, in which the IP address is the sender IP address of the packet body of the packet, and the MAC address is the sender MAC address of the packet body of the packet. Host 1 may issue the ARP entry into an ARP table.

As can be seen, the IP address in the ARP entry established by host 1 is the IP address of host 2, and the MAC address is the MAC address of edge node 2. Here, the MAC address of host 2 acquired by host 1 is the MAC address of edge node 2 in fact.

Host 1 may perform data communication with host 2, after acquiring the MAC address of "host 2" through the process shown in FIG. 1.

Figure 2:
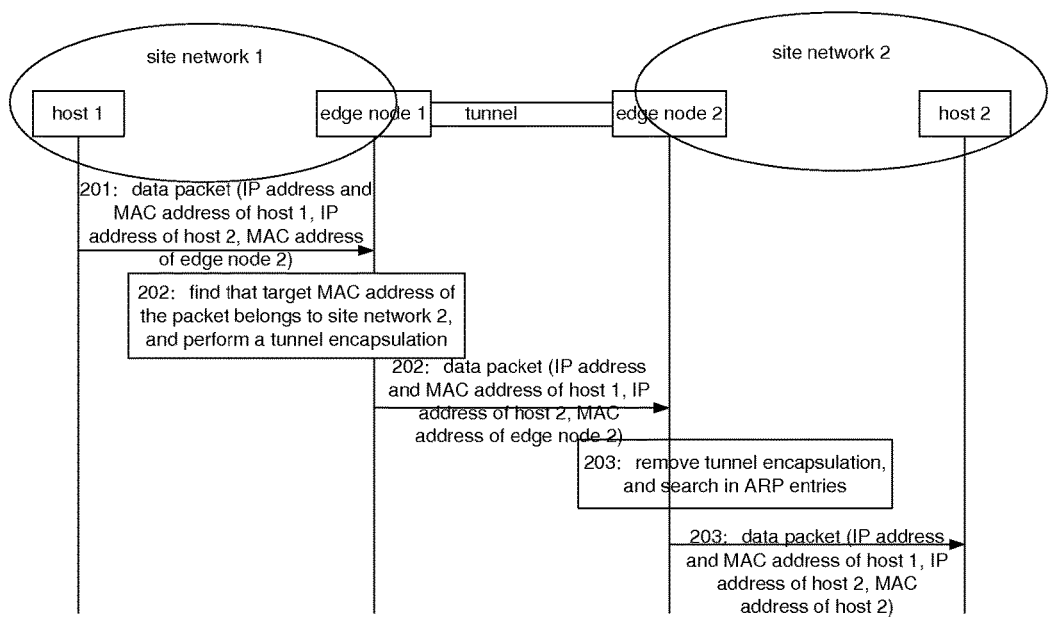
FIG. 2 is a flowchart illustrating a method for forwarding data in an overlay network, in accordance with an example of the present disclosure.

FIG. 2 is a flowchart illustrating a method for forwarding data in an overlay (e.g. EVI) network, in accordance with an example of the present disclosure. As shown in FIG. 2, the method may include the following blocks.

In block 201, when to transmit data to host 2 in site network 2, host 1 in site network 1 of the overlay network may search out in its own ARP entries a corresponding MAC address, based on the IP address of host 2, and construct a packet for the data. In the packet constructed, the destination IP address is the IP address of host 2, and the destination MAC address is the MAC address searched out. And then, host 1 may transmit the packet for the data.

The destination MAC address of the packet is the MAC address of edge node 2 of site network 2 in fact.

In block 202, edge node 1 of site network 1 may receive the packet for the data, find that the destination MAC address of the packet is the MAC address of site network 2, and perform the tunnel encapsulation (e.g. an EVI encapsulation) for the packet. The destination IP address of the tunnel encapsulation header (e.g. an EVI encapsulation header) is the IP address of edge node 2 of site network 2. And then, edge node 1 may transmit the encapsulated packet for the data via a tunnel (e.g. an EVI tunnel).

In block 203, edge node 2 of site network 2 may receive the packet for the data, remove the tunnel encapsulation (e.g. an EVI encapsulation), search in the ARP table for an ARP entry corresponding to the destination IP address of the packet, since the destination MAC address of the Ethernet frame header of the packet for the data is the MAC address of edge node 2. Edge node 2 may forward the packet to host 2, based on the MAC address in the ARP entry searched out.

As can be seen from the examples shown in FIG. 1 and FIG. 2, in the present disclosure an edge node does not need to save and maintain the MAC address of respective host device in remote site networks, and may need to save and maintain the MAC addresses of host devices in the local site network as well as the MAC addresses of edge nodes of remote site networks, which is different from functions of an edge node in the prior art. In the prior art, an edge node needs to save and maintain the MAC addresses of the devices in the local site network and the remote site networks. Thereby, a storage pressure on the edge node is greatly reduced, while normal and accurate forwarding of data may be ensured.

The examples shown in FIG. 1 and FIG. 2 are for IPv4 data transmission. IPv6 data transmission may be executed between hosts or between routers.

When the IPv6 data transmission is data transmission between hosts, the following replacements are to be made to the examples shown in FIG. 1 and FIG. 2.

1) Replace an ARP request with a Neighbor Solicitation (NS) and replace an ARP response with a Neighbor Advertisement (NA).

2) Replace an ARP entry with a Neighbor Discovery (ND) entry.

When the IPv6 data transmission is data transmission between routers, the following replacements are to be made to the examples shown in FIG. 1 and FIG. 2.

1) Replace a host with a router.

2) Replace an ARP request with a Router Solicitation (RS), and replace an ARP response with a Router Advertisement (RA).

3) Replace an ARP entry with an ND entry.

As can be seen from the above, in the examples of the present disclosure, edge node 1 may receive an IP address resolving request packet, which specifically may be an ARP request packet, a Neighbor Solicitation packet or a Router Solicitation packet, from a device (e.g., host 1) in the site network.

Then, edge node 1 may replace both the source MAC address of the Ethernet frame header and the sender MAC address in the packet body of the IP address resolving request packet with the MAC address of edge node 1, forward the packet to all of remote edge nodes via a tunnel (e.g. an EVI tunnel), such that each remote edge node may establish an entry, which is configured to record a corresponding relationship between the site network where the packet is from and the source MAC address of the Ethernet frame header of the packet, in a MAC address forwarding table.

In the above examples, edge node 2 may establish a corresponding relationship between the MAC address of edge node 1 and site network 1, after receiving the IP address resolving request packet via the tunnel (e.g. an EVI tunnel). Thus, after receiving an IP address resolving response packet returned by host 2, edge node 2 may search in the MAC address forwarding table based on the destination MAC address of the packet, and forward the packet to edge node 1 via the tunnel (e.g. an EVI tunnel). Finally, the packet may be forwarded to host 1. Thereby, forwarding of the IP address resolving packet across sites may be implemented, such that the edge nodes do not need to maintain information of MAC addresses of devices in remote site networks any longer.

Figure 3:
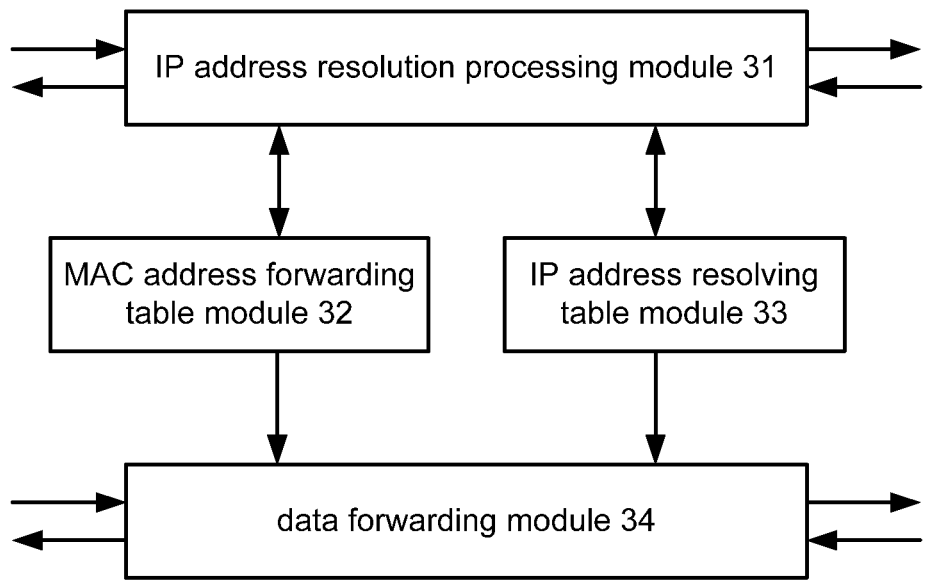
FIG. 3 is a schematic diagram illustrating a structure of an edge node in an overlay network, in accordance with an example of the present disclosure.

FIG. 3 is a schematic diagram illustrating a structure of an edge node in an overlay (e.g. EVI) network, in accordance with an example of the present disclosure. As shown in FIG. 3, the edge node mainly includes an IP address resolution processing module 31, a MAC address forwarding table module 32, an IP address resolving table module 33 and a data forwarding module 34.

The IP address resolution processing module 31 may receive an IP address resolving request packet from a device in the site, establish an IP address resolving entry, based on the sender IP address and the sender MAC address of the packet body of the packet, issue the IP address resolving entry to the IP address resolving table module 33, replace both the sender MAC address of the packet body of the packet and the source MAC address of the Ethernet frame header of the packet with the MAC address of this node, respectively perform the tunnel encapsulation (e.g. an EVI encapsulation) for the IP address resolving request packet, based on the IP address of each remote edge node stored by this node. The source IP address of the tunnel encapsulation header (e.g. an EVI encapsulation header) is the IP address of this node. The destination IP address of the tunnel encapsulation header (e.g. an EVI encapsulation header) is the IP address of a remote edge node. The IP address resolution processing module 31 may further transmit each encapsulated IP address resolving request packet via a corresponding tunnel (e.g. an EVI tunnel).

The IP address resolution processing module 31 may receive an IP address resolving request packet via a tunnel (e.g. an EVI tunnel), determine, based on a corresponding relationship between identifiers of site networks and IP addresses of edge nodes stored by this node, the identifier of the remote site network to which the source IP address of the tunnel encapsulation header (e.g. an EVI encapsulation header) of the packet belong, remove the tunnel encapsulation (e.g. an EVI encapsulation) of the packet, record a corresponding relationship between the source MAC address of the Ethernet frame header of the packet and the identifier of the remote site network in the MAC address forwarding table module 32, and broadcast the packet in the site.

The IP address resolution processing module 31 may receive an IP address resolving response packet from a device in the site, establish an IP address resolving entry, based on the sender IP address and the sender MAC address of the packet body of the packet, issue the IP address resolving entry to the IP address resolving table module 33, replace both the sender MAC address of the packet body of the packet and the source MAC address of the Ethernet frame header of the packet with the MAC address of this node, determine, based on the corresponding relationship between MAC addresses and identifiers of remote site networks stored by the MAC address forwarding table module 32, the remote site network to which the destination MAC address of the Ethernet frame header of the packet belong, and perform the tunnel encapsulation (e.g. an EVI encapsulation) for the packet. The destination IP address of the tunnel encapsulation header (e.g. an EVI encapsulation header) is the IP address of an edge node of the determined remote site network. And then, the IP address resolution processing module 31 may forward the packet via a tunnel (e.g. an EVI tunnel).

The IP address resolution processing module 31 may receive an IP address resolving response packet via the tunnel (e.g. an EVI tunnel), determine, based on IP addresses of edge nodes of each site network stored by this node, the remote site network to which the source IP address of the tunnel encapsulation header (e.g. an EVI encapsulation header) of the packet belong, remove the tunnel encapsulation (e.g. an EVI encapsulation) of the packet, save a corresponding relationship between the source MAC address of the Ethernet frame header of the packet and the identifier of the remote site network in the MAC address forwarding table module 32, search in the IP address resolving table module 33, based on the target IP address of the packet body of the packet, to search out the corresponding MAC address, and forward the packet to a device in the site based on the MAC address searched out, such that the device may establish an IP address resolving entry, based on the sender IP address and the sender MAC address of the packet body of the packet.

Here, when the overlay network is an IPv4 network, the IP address resolving request is an ARP request, the IP address resolving response is an ARP response, and the IP address resolving entry is an ARP entry. And, when the overlay network is an IPv6 network, the IP address resolving request is an NS or RS, the IP address resolving response is an NA or RA, and the IP address resolving entry is an ND entry.

The MAC address forwarding table module 32 may save MAC address forwarding entries, which may include a corresponding relationship between the identifier of a site network and MAC addresses in the site network.

The IP address resolving table module 33 may store IP address resolving entries.

The data forwarding module 34 may receive a data packet from a device in the site, determine, based on a corresponding relationship between identifiers of site networks and MAC addresses in the site networks stored by the MAC address forwarding table module 32, the remote site network to which the destination MAC address of the packet belong, perform the tunnel encapsulation (e.g. an EVI encapsulation) for the packet. The destination IP address of the tunnel encapsulation header (e.g. an EVI encapsulation header) is the IP address of an edge node of the determined remote site network. The data forwarding module 34 may forward the encapsulated packet to the remote edge node via a tunnel (e.g. an EVI tunnel). The data forwarding module 34 may receive a data packet via the tunnel (e.g. an EVI tunnel), remove the tunnel encapsulation (e.g. an EVI encapsulation) of the packet, search in the IP address resolving table module 33 based on the destination IP address of the packet for the corresponding MAC address, and forward the packet to a device in the site based on the MAC address searched out.

Figure 4:
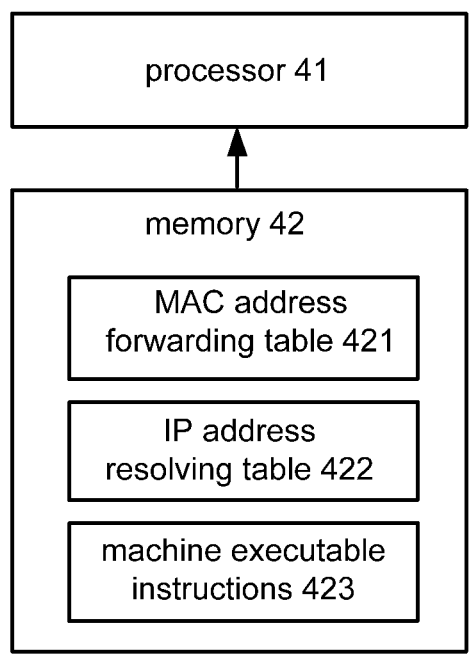
FIG. 4 is a schematic diagram illustrating a structure of an edge node in an overlay network, in accordance with another example of the present disclosure.

FIG. 4 is a schematic diagram illustrating a structure of an edge node in an overlay (e.g. EVI) network, in accordance with an example of the present disclosure. The edge node mainly includes a processor 41 and a memory 42.

Processor 41 is configured to communicate with memory 42, and to execute machine executable instructions stored in memory 42.

Memory 42 is configured to store a MAC address forwarding table 421, an IP address resolving table 422 and machine executable instructions 423. When being executed by processor 41, the machine executable instructions 423 may implement the following blocks. Receive a first IP address resolving request packet from a device in the site network. Replace both the source MAC address of the Ethernet frame header and the sender MAC address of the packet body of the first IP address resolving request packet with the MAC address of this node. Forward the packet to all of remote edge nodes via a tunnel (e.g. an EVI tunnel). Receive a first IP address resolving response packet corresponding to the first IP address resolving request packet returned by a remote device via the tunnel (e.g. an EVI tunnel). Both the destination MAC address of the Ethernet frame header and the target MAC address in the packet body of the first IP address resolving response packet are the MAC address of this node. Both the source MAC address of the Ethernet frame header and the sender MAC address in the packet body of the first IP address resolving response packet have been replaced with the MAC address of the remote edge node, before the first IP address resolving response packet is forwarded to the tunnel (e.g. an EVI tunnel) by a remote edge node of a remote site network. Determine the remote site network where the first IP address resolving response packet comes from. Record a corresponding relationship between the source MAC address of the Ethernet frame header of the first IP address resolving response packet and the remote site network in a MAC address forwarding table. Forward the first IP address resolving response packet to the corresponding device in the site, such that the device may establish an IP address resolving entry in the IP address resolving table, based on the sender IP address and the sender MAC address in the packet body.

When being executed by the processor 41, the machine executable instructions 423 in memory 42 are further configured to implement the following blocks. Acquire the source IP address in the tunnel encapsulation header (e.g. an EVI encapsulation header) of the first IP address resolving response packet. Determine, based on a remote site network corresponding to the source IP address, the remote site network where the first IP address resolving response packet comes from. Record a corresponding relationship between the source MAC address of the Ethernet frame header of the first IP address resolving response packet and the remote site network in the MAC address forwarding table.

When being executed by the processor 41, the machine executable instructions 423 in memory 42 are further configured to implement the following blocks. Establish an IP address resolving entry, based on the sender IP address and the sender MAC address in the packet body, after receiving the first IP address resolving request packet. Determine firstly whether the destination MAC address of the first IP address resolving response packet is this node, when to forward the first IP address resolving response packet to the corresponding device in the site. When determining that the destination MAC address of the first IP address resolving response packet is this node, search in IP address resolving entries, based on the target IP address in the packet body, and then forward the first IP address resolving response packet, based on the MAC address searched out.

When being executed by the processor 41, the machine executable instructions 423 in memory 42 are further configured to implement the following blocks. Search in the MAC address forwarding table, based on the destination MAC address of a data packet, when receiving the data packet from a device in the site. When determining that a remote site network corresponding to the destination MAC address of the data packet, forward the data packet to the remote site network via a tunnel (e.g. an EVI tunnel). When receiving a data packet via the tunnel (e.g. an EVI tunnel), remove the tunnel encapsulation (e.g. an EVI encapsulation) of the data packet. When the destination MAC address of the data packet is this node, search in IP address resolving entries based on the destination IP address of the data packet, and forward the data packet based on the MAC address searched out.

When being executed by the processor 41, the machine executable instructions 423 in memory 42 are further configured to implement the following blocks. Receive a second IP address resolving request packet forwarded by a remote edge node of a remote site network via a tunnel (e.g. an EVI tunnel). Both the source MAC address of the Ethernet frame header and the sender MAC address in the packet body of the second IP address resolving request packet have been replaced with the MAC address of the remote edge node of the remote site network, before the second IP address resolving request packet is forwarded to the tunnel (e.g. an EVI tunnel) by the remote edge node. Determine the remote site network where the second IP address resolving request packet comes from. Record a corresponding relationship between the source MAC address of the Ethernet frame header of the second IP address resolving request packet and the remote site network in the MAC address forwarding table. Broadcast the second IP address resolving request packet in the site network. Receive a second IP address resolving response packet corresponding to the second IP address resolving request packet returned by a device in the site network. The destination MAC address of the Ethernet frame header of the second IP address resolving response packet is the MAC address of the remote edge node. Both the source MAC address of the Ethernet frame header and the sender MAC address in the packet body of the second IP address resolving response packet are the MAC address of the device in the site network. Replace both the source MAC address of the Ethernet frame header and the sender MAC address in the packet body of the second IP address resolving response packet with the MAC address of this node. Search in the MAC address forwarding table, based on the destination MAC address of the Ethernet frame header of the second IP address resolving response packet. Forward the second IP address resolving response packet to the corresponding remote site network via the tunnel (e.g. an EVI tunnel).

When being executed by the processor 41, the machine executable instructions 423 in memory 42 are further configured to implement the following block. Acquire the source IP address in the tunnel encapsulation header (e.g. an EVI encapsulation header) of the second IP address resolving request packet. Determine, based on a remote site network corresponding to the source IP address, the remote site network where the second IP address resolving request packet comes from. Record a corresponding relationship between the source MAC address of the Ethernet frame header of the second IP address resolving request packet and the remote site network in the MAC address forwarding table.

When being executed by the processor 41, the machine executable instructions 423 in memory 42 are further configured to implement the following blocks. Establish an IP address resolving entry in the IP address resolving table, based on the sender IP address and the sender MAC address in the packet body, after receiving the second IP address resolving response packet.

There are a variety of examples in practice. For example, the MAC address forwarding table 421, the IP address resolving table 422 and the machine executable instructions 423 may be respectively stored in different memories. Alternatively, the MAC address forwarding table 421 and the IP address resolving table 422 may be stored in a memory. The machine executable instructions 423 may be stored in another memory.

When the overlay network is an IPv4 network, the IP address resolving request is an ARP request, the IP address resolving response is an ARP response, and the IP address resolving entry is an ARP entry.

When the overlay network is an IPv6 network, the IP address resolving request is an NS or RS, the IP address resolving response is an NA or RA, and the IP address resolving entry is an ND entry.

Figure 5:
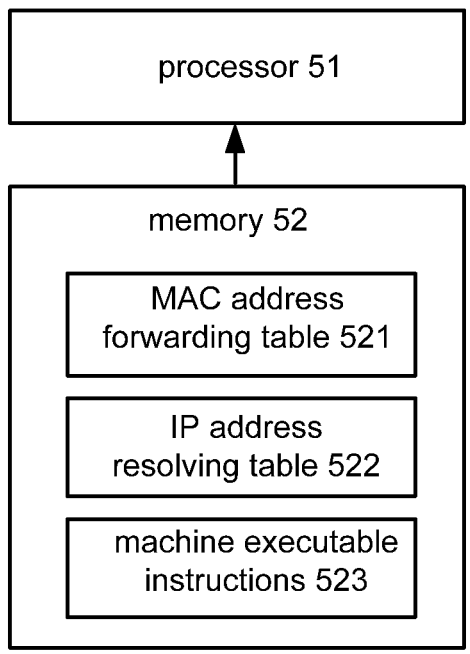
FIG. 5 is a schematic diagram illustrating a structure of an edge node in a first site network, in accordance with an example of the present disclosure.

FIG. 5 is a schematic diagram illustrating a structure of an edge device in an overlay (e.g. EVI) network, in accordance with an example of the present disclosure. The edge node is located in a first site network of the overlay network. As shown in FIG. 5, the edge node may include a memory 52, a processor 51 in communication with the memory 52. The memory 52 is configured to store a MAC address forwarding table 521, an IP address resolving table 522 and machine executable instructions 523 executable by the processor 51.

When being executed by the processor 51, the machine executable instructions 523 may implement the following blocks. Receive an IP address resolving request packet from a device in the first site network. Replace both the source MAC address of the Ethernet frame header and the sender MAC address of the packet body of the IP address resolving request packet with the MAC address of this node. Forward the IP address resolving request packet to a second site network via a tunnel connecting the first site network with the second site network.

In an example of the present disclosure, the machine executable instructions 523 stored in the memory 52 are further configured to implement the following blocks. Receive an IP address resolving response packet corresponding to the IP address resolving request packet returned by the second site network via the tunnel. Determine the second site network where the IP address resolving response packet comes from. Record a corresponding relationship between the source MAC address of the Ethernet frame header of the IP address resolving response packet and the second site network in the MAC address forwarding table 521. Forward the IP address resolving response packet to a corresponding device in the first site network, such that the device may establish an IP address resolving entry in the IP address resolving table 522, based on the sender IP address and the sender MAC address in the packet body of the IP address resolving response packet.

In an example of the present disclosure, the machine executable instructions 523 in the memory 52 are further configured to implement the following blocks. After receiving the IP address resolving request packet, establish an IP address resolving entry in the IP address resolving table 522, based on the sender IP address and the sender MAC address in the packet body of the IP address resolving request packet. When forwarding the IP address resolving response packet to a corresponding device in the first site network, firstly determine whether the destination MAC address of the IP address resolving response packet is the MAC address of this node, if yes, search for an IP address resolving entry based on the target IP address in the packet body of the IP address resolving response packet, and forward the IP address resolving response packet based on the MAC address searched out.

In an example of the present disclosure, the machine executable instructions 523 in memory 52 are further configured to implement the following blocks. When receiving a data packet from a device in the first site network, search in the MAC address forwarding table 521 based on the destination MAC address in the data packet. When determining that the destination MAC address of the data packet corresponding to the second site network, transmit the data packet to the second site network via the tunnel. When receiving the data packet via the tunnel, remove a tunnel encapsulation of the data packet. When determining that the destination MAC address of the data packet is the MAC address of this node, search for the IP address resolving entry based on the destination IP address of the data packet, and forward the data packet based on the MAC address searched out.

Figure 6:
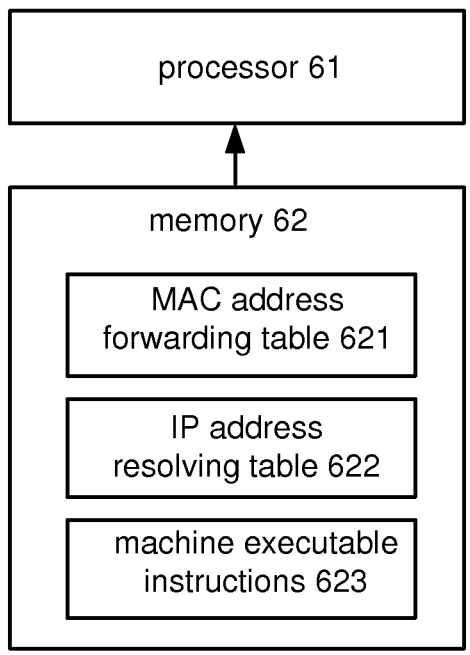
FIG. 6 is a schematic diagram illustrating a structure of an edge node in a second site network, in accordance with an example of the present disclosure.

FIG. 6 is a schematic diagram illustrating a structure of an edge node in an overlay (e.g. EVI) network, in accordance with an example of the present disclosure. The edge node is located in a second site network of the overlay network. As shown in FIG. 6, the edge node includes a memory 62, and a processor 61 in communication with the memory 62. The memory 62 is configured to store a MAC address forwarding table 621, an IP address resolving table 622, and machine executable instructions 623 executable by the processor 61. When being executed by the processor 61, the machine executable instructions 623 are configured to implement the following blocks. Receive an IP address resolving request packet forwarded by a first site network, via a tunnel connecting the second site network with the first site network. Determine the first site network where the IP address resolving request packet comes from. Record a corresponding relationship between the source MAC address of the Ethernet frame header of the IP address resolving request packet and the first site network in the MAC address forwarding table 621, and broadcast the IP address resolving request packet within the second site network. Receive an IP address resolving response packet corresponding to the IP address resolving request packet returned by a device in the second site network. Replace both the source MAC address of the Ethernet frame header in the IP address resolving response packet and the sender MAC address in the packet body in the IP address resolving response packet with the MAC address of this node. Search in the MAC address forwarding table 621, based on the destination MAC address of the Ethernet frame header of the IP address resolving response packet, and transmit the IP address resolving response packet to the first site network via the tunnel.

In an example of the present disclosure, the machine executable instructions 623 in the memory 62 are further configured to implement the following blocks. Obtain a source IP address in a tunnel encapsulation header of the IP address resolving request packet. Determine the first site network where the IP address resolving request packet comes from, based on the first site network corresponding to the source IP address. Record a corresponding relationship between the source MAC address of the Ethernet frame header of the IP address resolving request packet and the first site network in the MAC address forwarding table 621.

In an example of the present disclosure, the machine executable instructions 623 in the memory 62 are further configured to implement the following blocks. After receiving the IP address resolving response packet, establish an IP address resolving entry in the IP address resolving table 622, based on the sender IP address and the sender MAC address in the packet body of the IP address resolving response packet.

The memory mentioned in the examples of the present disclosure may include a floppy disk, a hard disk, a magneto-optical disk, an optical disk (such as compact disc (CD)-read-only memory (ROM), CD-recordable (CD-R), CD-rewritable (CD-RW), digital versatile disc (DVD)-ROM, DVD-random access memory (RAM), DVD-RW, DVD+RW), a magnetic tape, a nonvolatile memory card and ROM.

By employing the technical solution of the present disclosure, an entry storing pressure on an edge node may be reduced, when normal forwarding of data in an overlay network (e.g. an EVI network) is ensured.

The invention claimed is:

1. A method for resolving Internet Protocol (IP) addresses for use in an overlay network comprising multiple site networks, comprising:
receiving, by a first edge node of a first site network, an IP address resolving request packet (ARRP) from a source device in the first site network for a destination device in a second site network, the first edge node having a first Media Access Control (MAC) address that is hardcoded to the first edge node;
replacing, by the first edge node, both a source MAC address of an Ethernet frame header and a sender MAC address in a packet body of the IP ARRP with the first MAC address of the first edge node;
forwarding the IP ARRP from the first edge node to a second edge node in the second site network via a tunnel linking the first site network and the second site network, the second edge node having a second MAC address that is hardcoded to the second edge node;
receiving, by the first edge node from the second edge node, an IP address resolving response packet corresponding to the IP ARRP for the destination device in the second site network; and
responsive to receiving the IP address resolving response packet, storing, by the first edge node, the second MAC address of the second edge node as a MAC address of the destination device in a MAC address forwarding table of the first edge node, in lieu of an actual MAC address assigned to the destination device.

2. The method according to claim 1, further comprising:
receiving, by the first edge node, the IP address resolving response packet via the tunnel;
determining, by the first edge node, the second site network where the IP address resolving response packet was received;
wherein storing the second MAC address further comprises recording a corresponding relationship between the second MAC address of an Ethernet frame header of the IP address resolving response packet and the second site network in the MAC address forwarding table; and
forwarding the IP address resolving response packet to the source device in the first site network.

3. The method according to claim 2, further comprising:
establishing, by the first edge node, an IP address resolving entry based on a sender IP address and a sender MAC address in the packet body of the IP address resolving request packet;
wherein forwarding the IP address resolving response packet to the source device in the first site network comprises:
searching, by the first edge node, in IP address resolving entries based on a target IP address in the packet body of the IP address resolving response packet, and forwarding the IP address resolving response packet based on the MAC address corresponding to a result of the search, when determining that a destination MAC address of the IP address resolving response packet is the first MAC address of the first edge node.

4. The method according to claim 2, further comprising:
receiving, by the first edge node, a data packet from a device in the first site network, searching in the MAC address forwarding table based on a destination MAC address of the data packet;
in response to a determination that the second edge node in the second site network corresponds to the destination MAC address of the data packet, forwarding the data packet to the second edge node via the tunnel; and
in response to a determination that the destination MAC address of the data packet is the first MAC address of the first edge node, searching in IP address resolving entries based on the destination IP address of the data packet, and forwarding the data packet based on the MAC address corresponding to a result of the search.

5. The method according to claim 1, further comprising:
acquiring, by the first edge node, a source IP address in a tunnel encapsulation header of the IP address resolving response packet;
determining, based on the second site network corresponding to the source IP address, the second site network; and
wherein storing the second MAC address further comprises recording a corresponding relationship between the second MAC address of an Ethernet frame header of the IP address resolving response packet and the second site network in the MAC address forwarding table.

6. The method according to claim 1, wherein the destination device is assigned a third MAC address, the method further comprising:
storing the second MAC address assigned to the second edge node for the destination device without storing the third MAC address assigned to the destination device in the MAC address forwarding table.

7. The method according to claim 1, further comprising:
storing the second MAC address assigned to the second edge node as MAC addresses for each of the devices in the second site network.

8. A method for resolving Internet Protocol (IP) addresses for use in an overlay network comprising multiple site networks, comprising:
receiving, by a second edge node in a second site network, an IP address resolving request packet (ARRP) of a source device forwarded by a first edge node in a first site network via a tunnel linking the second site network and the first site network, the first edge node having a first Media Access Control (MAC) address that is hardcoded to the first edge node and the second edge node being having a second MAC address that is hardcoded to the second edge node;
determining, by the second edge node, the first site network where the IP address resolving request packet was received;
responsive to receiving the IP ARRP, recording, by the second edge node, the first MAC address of the first edge node as a MAC address of the source device in a MAC address forwarding table of the second edge node, in lieu of an actual MAC address assigned to the source device; and
broadcasting the IP address resolving request packet within the second site network.

9. The method according to claim 8, further comprising:
establishing, by the second edge node, an IP address resolving entry based on a sender IP address and a sender MAC address in the packet body of the IP address resolving response packet.

10. The method according to claim 8, wherein the source device is assigned a third MAC address, the method further comprising:
storing the second MAC address assigned to the second edge node for the destination device without storing the third MAC address assigned to the source device in the MAC address forwarding table.

11. The method according to claim 8, further comprising:
receiving, by the second edge node, an IP address resolving response packet corresponding to the IP address resolving request packet returned by a destination device in the second site network;
searching, by the second edge node, in the MAC address forwarding table, a destination MAC address in an Ethernet frame header of the IP address resolving response packet;
replacing a source MAC address of the Ethernet frame header of the IP address resolving response packet and a sender MAC address in a packet body of the IP address resolving response packet with the second MAC address assigned to the second edge node; and
transmitting the IP address resolving response packet to the first site network corresponding to the destination MAC address of the IP address resolving response packet via the tunnel.

12. An edge node located in a first site network of an overlay network, the edge node comprising:
a processor; and
a memory in communication with the processor, the memory to store a Media Access Control (MAC) address forwarding table, an Internet Protocol (IP) address resolving table, and machine executable instructions executable by the processor to:
receive an IP address resolving request packet (ARRP) from a source device in the first site network for a destination device in a second site network;
replace both a source MAC address of an Ethernet frame header and a sender MAC address of a packet body of the IP address resolving request packet with a MAC address of the edge node that is hardcoded to the edge node;
forward the IP ARRP to a second edge node in the second site network via a tunnel linking the first site network and the second site network, the second edge node having a second MAC address that is hardcoded to the second edge node;
receive an IP address resolving response packet corresponding to the IP ARRP from the second edge node; and
responsive to receiving the IP address resolving response packet, record the second MAC address of the second edge node as a MAC address of the destination device in the MAC address forwarding table of the edge node, in lieu of an actual MAC address assigned to the destination device.

13. The edge node according to claim 12, wherein the machine executable instructions are further executable by the processor to:
receive the IP address resolving response packet via the tunnel;
determine the second site network where the IP address resolving response packet was received;
record a corresponding relationship between a source MAC address of an Ethernet frame header of the IP address resolving response packet and the second site network in the MAC address forwarding table to store the second MAC address; and
forward the IP address resolving response packet to the source device in the first site network.

14. The edge node according to claim 13, wherein the machine executable instructions are further executable by the processor to:
after receiving the IP address resolving response packet, establish an IP address resolving entry in the IP address resolving table based on a sender IP address and a sender MAC address in the packet body of the IP address resolving response packet;
determine whether a destination MAC address of the IP address resolving response packet is the MAC address of the edge node;
in response to a determination that the destination MAC address of the IP address resolving response packet is the MAC address of the edge node, search in the IP address resolving entries based on a target IP address in the packet body of the IP address resolving response packet, and forward the IP address resolving response packet based on the MAC address corresponding to a result of the search.

15. The edge node according to claim 13, wherein when being executed by the processor, the machine executable instructions are further executable by the processor to:

in response to receipt of a data packet from a device in the first site network, search in the MAC address forwarding table based on a destination MAC address of the data packet and in response to a determination that the destination MAC address of the data packet corresponds to the second edge node in the second site network, forward the data packet to the second edge node via the tunnel;

in response to receipt of a data packet via the tunnel, determine whether the destination MAC address of the data packet is the MAC address of the edge node; and in response to a determination that the destination MAC address is the MAC address of the edge node,
remove a tunnel encapsulation of the data packet,
search in IP address resolving entries based on the destination IP address of the data packet, and
forward the data packet based on the MAC address corresponding to a result of the search.

16. The edge node according to claim 12, wherein the destination device is assigned a third MAC address and wherein the machine executable instructions are further executable by the processor to record the second MAC address assigned to the second edge node for the destination device without storing the third MAC address assigned to the destination device in the MAC address forwarding table.

17. An edge node located in a second site network of an overlay network, the edge node being assigned a MAC address, the edge node comprising:
a processor; and
a memory in communication with the processor, the memory to store a media access control (MAC) address forwarding table, an Internet Protocol (IP) address resolving table, and machine executable instructions executable by the processor to:
receive an IP address resolving request packet (ARRP) of a source device forwarded by a first edge node in a first site network via a tunnel linking the second site network and the first site network, the first edge node having a first Media Access Control (MAC) address hardcoded to the first edge node and the edge node having a second MAC address hardcoded to the edge node;
determine the first site network where the IP address resolving request packet comes from;
responsive to receiving the IP ARRP, record the first MAC address of the first edge node as a MAC address of the source device within a MAC address forwarding table of the edge node, in lieu of an actual MAC address assigned to the source device; and
broadcast the IP address resolving request packet in the second site network.

18. The edge node according to claim 17, wherein the machine executable instructions are further executable by the processor to:
establish an IP address resolving entry in the IP address resolving table, based on a sender IP address and a sender MAC address in the packet body of the IP address resolving response packet.

19. The edge node according to claim 17, wherein the machine executable instructions are further executable by the processor to:
receive an IP address resolving response packet corresponding to the IP address resolving request packet returned by a destination device in the second site network;
search, in the MAC address forwarding table, a destination MAC address in an Ethernet frame header of the IP address resolving response packet;
replace both a source MAC address of the Ethernet frame header and a sender MAC address in a packet body of the IP address resolving response packet with the MAC address assigned to the edge node; and
forward the IP address resolving response packet to the first site network corresponding to the destination MAC address of the IP address resolving response packet via the tunnel.

20. The edge node according to claim 17, wherein the source device is assigned a third MAC address and wherein the machine executable instructions are further executable by the processor to record the second MAC address assigned to the first edge node for the destination device without storing the third MAC address assigned to the source device in the MAC address forwarding table.

* * * * *